United States Patent
Mayumi et al.

(10) Patent No.: US 11,429,227 B2
(45) Date of Patent: Aug. 30, 2022

(54) ELECTRONIC DEVICE PROVIDED WITH POSITION DETECTOR AND TOUCH POSITION DETECTION METHOD

(71) Applicant: Sharp Kabushiki Kaisha, Sakai (JP)

(72) Inventors: Masashi Mayumi, Sakai (JP); Daiji Kitagawa, Sakai (JP); Atsushi Aoki, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/298,753

(22) PCT Filed: Jan. 15, 2019

(86) PCT No.: PCT/JP2019/000878
§ 371 (c)(1),
(2) Date: Jun. 1, 2021

(87) PCT Pub. No.: WO2020/148798
PCT Pub. Date: Jul. 23, 2020

(65) Prior Publication Data
US 2022/0057933 A1     Feb. 24, 2022

(51) Int. Cl.
*G06F 3/041* (2006.01)
*G06F 1/16* (2006.01)

(52) U.S. Cl.
CPC ...... *G06F 3/041662* (2019.05); *G06F 1/1652* (2013.01); *G06F 3/0412* (2013.01)

(58) Field of Classification Search
CPC . G06F 3/0412; G06F 3/041662; G06F 1/1652
USPC ................................................ 345/173, 174
See application file for complete search history.

(56) References Cited

U.S. PATENT DOCUMENTS

| | | | | |
|---|---|---|---|---|
| 10,146,390 B1* | 12/2018 | Ogirko | ............. | G06F 3/0416 |
| 10,963,098 B1* | 3/2021 | Zoubir | ............. | G06F 3/04186 |
| 2018/0024670 A1* | 1/2018 | Okada | ............. | G06F 3/0443 |
| | | | | 345/174 |
| 2020/0333939 A1* | 10/2020 | Nomura | ............. | G06F 3/038 |

FOREIGN PATENT DOCUMENTS

| | | |
|---|---|---|
| JP | 2017-187946 A | 10/2017 |
| WO | 2016/129483 A1 | 8/2016 |

* cited by examiner

*Primary Examiner* — Calvin C Ma
(74) *Attorney, Agent, or Firm* — Keating & Bennett, LLP

(57) ABSTRACT

There is achieved an electronic device including a position detector that can detect a touch position with high accuracy even when thickness reduction proceeds. A touch position detection method includes: a first determination step (S710) of determining whether or not negative-value data is included in mutual capacitance detection data; a second determination step (S720) of determining whether or not a mutual capacitance detection region and a self-capacitance detection region overlap; a third determination step (S730) of determining whether or not the maximum value of the absolute value of negative-value data and the area of a negative-value data region are equal to or greater than thresholds; a correction step (S740) of correcting the mutual capacitance detection data on the basis of self-capacitance detection data; and a touch position specification step (S750) of specifying a touch position on the basis of the mutual capacitance detection data after the correction.

16 Claims, 19 Drawing Sheets

| | | | | | | |
|---|---|---|---|---|---|---|
| ...... | 0.01003 | 0.01898 | 0.02219 | 0.02158 | 0.01375 | ...... |
| ...... | 0.01364 | 0.02580 | 0.03017 | 0.02933 | 0.01870 | ...... |
| ...... | 0.01512 | 0.02860 | 0.03345 | 0.03252 | 0.02072 | ...... |
| ...... | 0.01546 | 0.02923 | 0.03419 | 0.03324 | 0.02118 | ...... |
| ...... | 0.01516 | 0.02868 | 0.03354 | 0.03261 | 0.02078 | ...... |
| ...... | 0.01298 | 0.02455 | 0.02871 | 0.02791 | 0.01779 | ...... |
| ...... | 0.00618 | 0.01168 | 0.01366 | 0.01328 | 0.00847 | ...... |

Fig.20

| | | | | | | |
|---|---|---|---|---|---|---|
| ...... | 301 | 568 | 665 | 646 | 412 | ...... |
| ...... | 409 | 773 | 904 | 879 | 560 | ...... |
| ...... | 453 | 857 | 1002 | 974 | 621 | ...... |
| ...... | 463 | 876 | 1024 | 996 | 634 | ...... |
| ...... | 454 | 859 | 1005 | 977 | 623 | ...... |
| ...... | 389 | 735 | 860 | 836 | 533 | ...... |
| ...... | 185 | 350 | 409 | 398 | 254 | ...... |

ELECTRONIC DEVICE PROVIDED WITH POSITION DETECTOR AND TOUCH POSITION DETECTION METHOD

TECHNICAL FIELD

The following disclosure relates to an electronic device (e.g., organic electroluminescence (EL) display device) provided with a position detector and to a touch position detection method.

BACKGROUND ART

In recent years, organic EL display devices provided with pixel circuits including organic EL elements have been put into practical use. The organic EL element is also referred to as an Organic Light-Emitting Diode (OLED) and is a self-emitting display element that emits light with a luminance corresponding to a current flowing therethrough. Since the organic EL element is a self-emitting display element as described above, the thickness of the organic EL display device can be easily reduced compared to a liquid crystal display device requiring a backlight, a color filter, and the like. Regarding such an organic EL display device, a technique for providing a touch panel on the surface of a panel (organic EL panel) has also been put into practical use. Examples of the organic EL display device with a touch panel include a smartphone and a tablet terminal.

With respect to a touch panel, improvement in touch-position detection accuracy has been an issue. In the touch panel disclosed in WO 2016/129483, the touch-position detection accuracy is enhanced by combining self-capacitance sensing (position detection by a self-capacitance system) and mutual capacitance sensing (position detection by a mutual capacitance system). Note that both the self-capacitance system and the mutual capacitance system are systems of position detection by an electrostatic capacitance system. The self-capacitance system is a system of measuring the position of a recognition object by detecting an increase in electrostatic capacitance caused by contact or approach of the recognition object to a touch panel. The mutual capacitance system is a system of measuring the position of a recognition object on the basis of the difference in electrostatic capacitance between adjacent sensors caused by contact or approach of the recognition object to a touch panel. Japanese Laid-Open Patent Publication No. 2017-187946 also discloses a touch panel for detecting a touch position by combining self-capacitance sensing and mutual capacitance sensing.

RELATED ART DOCUMENTS

Patent Documents

[Patent Document 1] WO 2016/129483
[Patent Document 2] Japanese Laid-Open Patent Publication No. 2017-187946

SUMMARY

Problems to be Solved

By the way, in recent years, a bendable ultra-thin display (e.g., organic EL display device, liquid crystal display device) as illustrated in FIG. 24 has been developed. In the ultra-thin display, for example, a new material such as a "cover film" or a "window film" is used as a cover material in place of the known cover glass in order to achieve thickness reduction. In some cases, a configuration in which a circular polarization plate is formed inside the cover film in a coating form is adopted.

However, there is a problem that the touch-position detection accuracy decreases with the progress of the thickness reduction. This will be described below. In the touch panel of the electrostatic capacitance system, sensor sensitivity is determined in accordance with a distance between a recognition object and a sensor electrode. The distance between the recognition object and the sensor electrode is determined by the thickness of a member such as a cover material disposed on the sensor electrode. In a configuration in which a cover glass is used as the cover material, there is an appropriate interval between a contact surface of a finger as the recognition object and the sensor electrode. Therefore, when the mutual capacitance sensing is performed, a detection result (appropriate detection result) such as that illustrated in FIG. 25 is obtained for a certain row. In contrast, in a configuration in which a cover film is used as the cover material, the contact surface of the finger and the sensor electrode are located at a very close distance (e.g., a distance of 0.1 mm or less). Further, the cover film has flexibility, and hence the member may be deformed during touching. In addition, there may be an influence of coupling (capacitive coupling) between the finger and the sensor electrode (hereinafter referred to as "adjacent sensor electrode") adjacent to the sensor electrode corresponding to the touch position. From the above, when the mutual capacitance sensing is performed, a detection result illustrated in FIG. 26 may be obtained for a certain row. In FIG. 26, a signal value as a detection result is a negative value in a range of an arrow denoted by reference numeral 91. Hereinafter, such a negative-value signal (negative-value data) that occurs during sensing is referred to as a "negative signal" in the present specification. In the known configuration, since the generation of such a negative signal is not assumed, when the negative signal occurs, the touch position cannot be specified correctly.

Here, the influence of coupling between the adjacent sensor electrode and the finger will be described. FIG. 27 is a diagram for explaining the flow of electricity in a case where there is a sufficient interval between the finger and the sensor electrode. FIG. 28 is a diagram for explaining the flow of electricity in a case where the distance between the finger and the sensor electrode is extremely short. Regarding the mutual capacitance sensing, the sensor electrode is made up of a transmission-side electrode Tx and a reception-side electrode Rx. In FIGS. 27 and 28, a transmission-side electrode Tx (93) and a reception-side electrode Rx (93) are sensor electrodes corresponding to a touch position, and a transmission-side electrode Tx (94) and a reception-side electrode Rx (94) are adjacent sensor electrodes. In a case where there is a sufficient interval between the finger and the sensor electrode, as indicated by an arrow denoted by reference numeral 92 in FIG. 27, electricity flows from the transmission-side electrode Tx (93) corresponding to a touch position to a ground GND of the human body via the finger. This causes a difference between the amount of electricity flowing from the transmission-side electrode Tx (93) to the reception-side electrode Rx (93) and the amount of electricity flowing from the transmission-side electrode Tx (94) to the reception-side electrode Rx (94). This difference appears as a positive value of the detection signal. In contrast, in a case where the distance between the finger and the sensor electrode is extremely short, as indicated by an arrow denoted by reference numeral 95 in FIG. 28, electricity also flows from the transmission-side electrode Tx (94) serving as the adjacent sensor electrode to the reception-side electrode Rx (93) corresponding to a touch position via the finger. As a result, the amount of electricity flowing to the reception-side electrode Rx (93) increases, and the negative signal described above appears.

As described above, in the ultra-thin display, a negative signal may occur during the mutual capacitance sensing. When a negative signal occurs, an in-plane distribution of a signal value (a signal value as a detection result) is disturbed. A touch position is typically obtained by calculating the center of gravity on the basis of the in-plane distribution of the signal value, so that when the in-plane distribution of the signal value is disturbed, a touch position cannot be obtained correctly. As a result, the touch-position detection accuracy deteriorates.

Accordingly, it is an object of the following disclosure to achieve an electronic device provided with a position detector that can detect a touch position with high accuracy even when thickness reduction proceeds.

Means for Solving the Problems

An electronic device according to some embodiments of the present disclosure is an electronic device including:
a display panel configured to display an image; and
a position detector configured to detect a touch position, wherein
the position detector includes
a touch panel provided on a surface of the display panel,
a touch panel drive circuit configured to drive the touch panel so that a touch position is detected by both a self-capacitance system and a mutual capacitance system, and
a position detection circuit configured to specify a touch position on a basis of self-capacitance detection data being data detected by the self-capacitance system and mutual capacitance detection data being data detected by the mutual capacitance system, and
in a case where negative-value data is included in the mutual capacitance detection data, when there is a region where a mutual capacitance detection region including a negative-value data region in which negative-value data is detected by the mutual capacitance system and a positive-value data region that is adjacent to the negative-value data region and in which positive-value data is detected by the mutual capacitance system overlaps with a self-capacitance detection region in which significant data is detected by the self-capacitance system, the position detection circuit executes correction processing for correcting the mutual capacitance detection data on a basis of the self-capacitance detection data and specifies a touch position on a basis of the mutual capacitance detection data after the correction processing.

A touch position detection method according to some embodiments of the present disclosure is a touch position detection method performed by a position detector capable of detecting a touch position by both a self-capacitance system and a mutual capacitance system, the method including:
a first determination step of determining whether mutual capacitance detection data, that is data detected by the mutual capacitance system, includes negative-value data
a second determination step of determining, when it is determined in the first determination step that the mutual capacitance detection data includes the negative-value data, whether there is a region where a mutual capacitance detection region including a negative-value data region in which negative-value data is detected by the mutual capacitance system and a positive-value data region that is adjacent to the negative-value data region and in which positive-value data is detected by the mutual capacitance system overlaps with a self-capacitance detection region in which significant data is detected by the self-capacitance system;
a third determination step of determining, when it is determined in the second determination step that there is a region in which the mutual capacitance detection region overlap with the self-capacitance detection region, whether a maximum value of an absolute value of the negative-value data and an area of the negative-value data region are equal to or greater than respective predetermined thresholds;
a correction step of correcting the mutual capacitance detection data on a basis of significant data detected by a self-capacitance system when it is determined in the third determination step that both the maximum value of the absolute value of the negative-value data and the area of the negative-value data region are equal to or greater than the respective predetermined thresholds; and
a touch position specification step of specifying a touch position on a basis of the mutual capacitance detection data after the correction by the correction step.

Effects of the Disclosure

According to some embodiments of the present disclosure, in a case where negative-value data occurs by mutual capacitance sensing (position detection by the mutual capacitance system), when a predetermined condition is satisfied, mutual capacitance detection data is corrected on the basis of self-capacitance detection data. A touch position is then specified on the basis of the mutual capacitance detection data after the correction. Since a stable detection result can be obtained by self-capacitance sensing (position detection by self-capacitance system) regardless of a distance from a recognition object such as a finger to a touch panel, by correcting the mutual capacitance detection data on the basis of the self-capacitance detection data, the value of the mutual capacitance detection data after the correction can be set to a suitable value from which the influence of the negative-value data has been removed. Thus, even when negative-value data occurs, a touch position can be specified with high accuracy. From the above, there is achieved an electronic device (organic EL display device, liquid crystal display device, etc.) provided with a position detector that can detect a touch position with high accuracy even when thickness reduction proceeds.

BRIEF DESCRIPTION OF THE DRAWINGS

FIG. 20 is a diagram illustrating an example of data obtained by normalizing the data illustrated in FIG. 7 in the embodiment.

DESCRIPTION OF EMBODIMENTS

An embodiment will be described below with reference to the accompanying drawings. In the following, an organic EL display device will be described as an example of an electronic device provided with a touch panel. Further, in the following, m, n, M, and N are integers of 2 or more, i is an integer of 1 or more and n or less, and j is an integer of 1 or more and m or less. Detection data obtained by self-capacitance sensing is referred to as "self-capacitance detection data", and detection data obtained by mutual capacitance sensing is referred to as "mutual capacitance detection data".

1. Outline of Configuration and Operation of Organic EL Display Device

Figure 2:
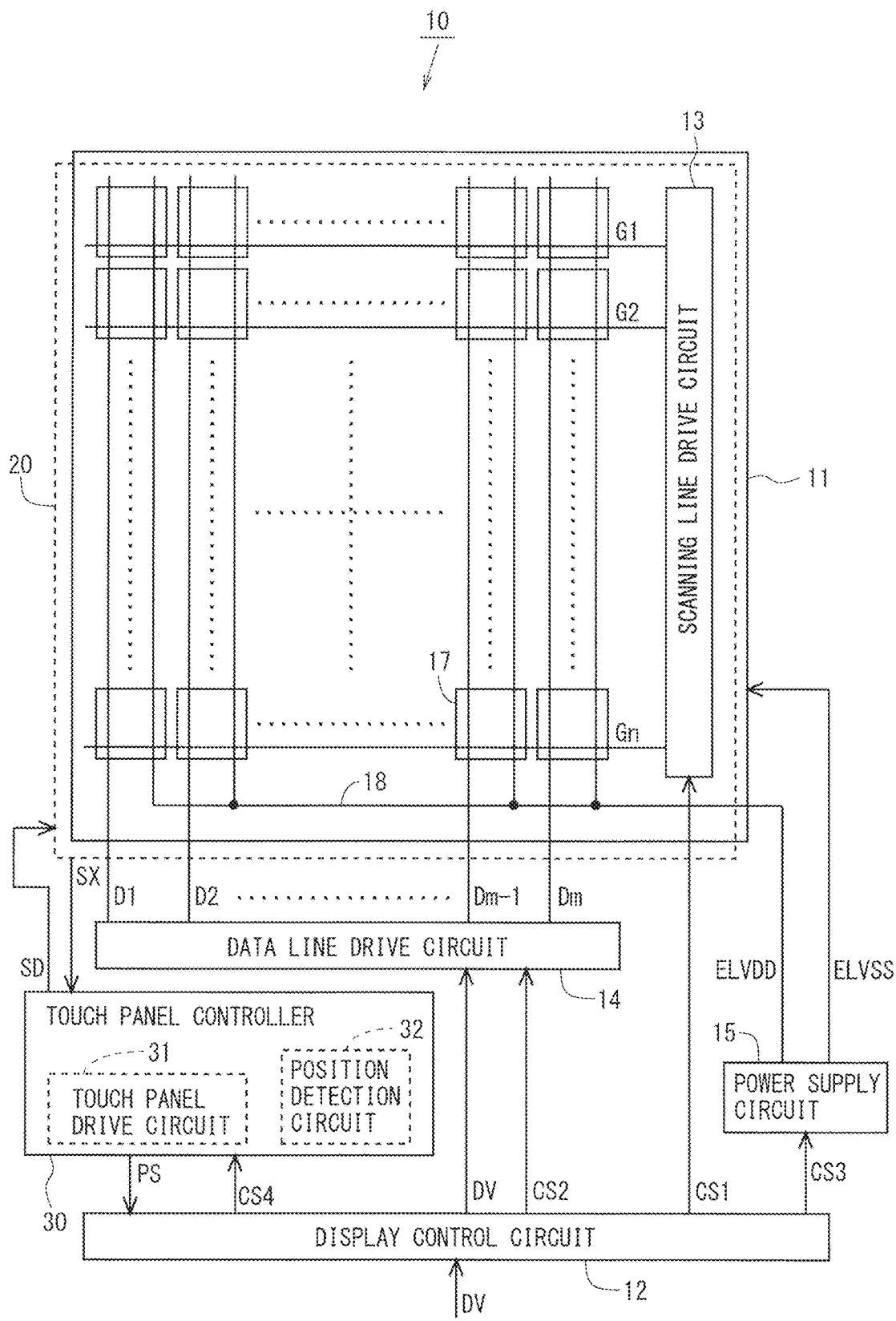
FIG. 2 is a block diagram illustrating the overall configuration of an organic EL display device in the embodiment.

FIG. 2 is a block diagram illustrating a configuration of an organic EL display device 10 according to an embodiment. The organic EL display device 10 includes an organic EL panel (display panel) 11, a display control circuit 12, a scanning line drive circuit 13, a data line drive circuit 14, a power supply circuit 15, a touch panel 20, and a touch panel controller 30.

The touch panel 20 is provided on the surface of the organic EL panel 11. The surface of the touch panel 20 is formed of a film-shaped cover material called a "cover film" or a "window film". The organic EL panel 11 and the touch panel 20 have flexibility. That is, the organic EL display device 10 according to the present embodiment is a bendable ultra-thin display with a touch panel.

The organic EL panel 11 includes n scanning lines G1 to Gn, m data lines D1 to Dm, and (m×n) pixel circuits 17. The scanning lines G1 to Gn are arranged parallel to each other. The data lines D1 to Dm are arranged parallel to each other. The scanning lines G1 to Gn and the data lines D1 to Dm are orthogonal to each other. The (m×n) pixel circuits 17 are arranged corresponding to the intersections of the scanning lines G1 to Gn and the data lines D1 to Dm.

The display control circuit 12 outputs control signals CS1, CS2, CS3, and CS4 to the scanning line drive circuit 13, the data line drive circuit 14, the power supply circuit 15, and the touch panel controller 30, respectively. The display control circuit 12 also outputs a video signal DV, that is inputted from the outside of the organic EL display device 10, to the data line drive circuit 14. At that time, an appropriate correction may be applied to the video signal DV.

The scanning line drive circuit 13 drives the scanning lines G1 to Gn on the basis of the control signal CS1. The data line drive circuit 14 drives the data lines D1 to Dm on the basis of the control signal CS2 and the video signal DV. More specifically, in each line period, the scanning line drive circuit 13 selects one scanning line from the n scanning lines G1 to Gn and applies a selection voltage (voltage by which a write control transistor in the pixel circuit 17 is turned on) to the selected scanning line. Thus, m pixel circuits 17 connected to the selected scanning lines are selected collectively. The data line drive circuit 14 applies m data voltages corresponding to the video signal DV to the data lines D1 to Dm, respectively. Thus, the m data voltages are written into the m selected pixel circuits. Note that the scanning line drive circuit 13 is formed in the organic EL panel 11 together with the pixel circuit 17.

In the organic EL panel 11, there are formed a common electrode (not illustrated in FIG. 2) which is an electrode for supplying a low-level power supply voltage ELVSS common to the (m×n) pixel circuits 17, and a power supply wiring 18 for supplying a high-level power supply voltage ELVDD to the (m×n) pixel circuits 17. The power supply circuit 15 applies the low-level power supply voltage ELVSS to the common electrode and applies the high-level power supply voltage ELVDD to the power supply wiring 18 on the basis of the control signal CS3.

The touch panel controller 30 includes a touch panel drive circuit 31 and a position detection circuit 32. The touch panel controller 30 controls the operation of the touch panel 20. At that time, the touch panel drive circuit 31 supplies a drive signal SD for detecting a touch position to the touch panel 20 on the basis of the control signal CS4 supplied from the display control circuit 12. Meanwhile, in the present embodiment, a configuration capable of detecting a touch position by both a self-capacitance system and a mutual capacitance system is adopted. That is, the touch panel drive circuit 31 drives the touch panel 20 so that a touch position is detected by both the self-capacitance system and the mutual capacitance system. When a detection signal SX is supplied to the touch panel controller 30 from the touch panel 20, the position detection circuit 32 specifies a position where a touch has been made on the touch panel 20 on the basis of the detection signal SX. More specifically, the mutual capacitance detection data and the self-capacitance detection data are obtained from the detection signal SX, and the position detection circuit 32 specifies the touch position on the basis of the self-capacitance detection data and the mutual capacitance detection data (however, as will be described later, the final specification of the touch position is made only on the basis of the mutual capacitance detection data.). Then, the touch panel controller 30 supplies a control signal (position signal) PS to the display control circuit 12 so that processing depending on the touch position is performed.

Note that, in the present embodiment, a position detector is achieved by the touch panel 20 and the touch panel controller 30 (the touch panel drive circuit 31 and the position detection circuit 32).

Figure 3:
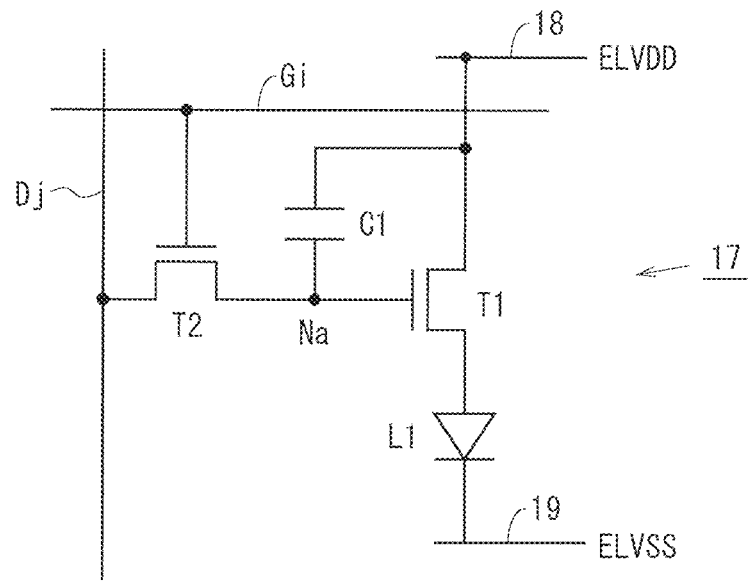
FIG. 3 is a circuit diagram of a pixel circuit in the embodiment.

FIG. 3 is a circuit diagram of the pixel circuit 17 in the i-th row and j-th column. The pixel circuit 17 includes a transistor (drive transistor) T1, a transistor (write control transistor) T2, a capacitor C1, and an organic EL element L1. The organic EL element L1 is an electro-optical element that emits light in any color of red, green, and blue. The transistors T1, T2 are N-channel thin-film transistors (TFT). As each of the transistors T1, T2, an oxide TFT (a thin-film transistor using an oxide semiconductor as a channel layer), an amorphous silicon TFT, or the like can be adopted. Examples of the oxide TFT include a TFT containing indium gallium zinc oxide (InGaZnO). By adopting the oxide TFT, for example, high definition and low power consumption can be achieved. Note that, as for the transistor T2, the relationship between the high and low potentials of two terminals except for a gate terminal (control terminal) is switched depending on the state. Accordingly, as for the transistor T2, one of the two terminals except for the gate terminal is referred to as a "first conduction terminal", and the other terminal is referred to as a "second conduction terminal".

The gate terminal of the transistor T1, the second conduction terminal of the transistor T2, and one end of the capacitor C1 are connected to each other. Note that a region (wiring) in which these are connected to each other is referred to as a "control node". The control node is denoted by symbol Na. The transistor T1 has a gate terminal connected to a control node Na, a drain terminal connected to the power supply wiring 18 to which the high-level power supply voltage ELVDD is applied, and a source terminal connected to the anode terminal of the organic EL element L1. The transistor T2 has the gate terminal connected to the scanning line Gi, the first conduction terminal connected to the data line Dj, and the second conduction terminal connected to the control node Na. The capacitor C1 has one end connected to the control node Na and has the other end connected to the drain terminal of the transistor T1. The organic EL element L1 has the anode terminal connected to the source terminal of the transistor T1 and has a cathode terminal connected to the common electrode 19 to which the low-level power supply voltage ELVSS is applied.

When the voltage of the scanning line Gi becomes high, the transistor T2 is turned on, and the voltage of the data line Dj is applied to the control node Na. When the voltage of the scanning line Gi becomes low, the transistor T2 comes into an off state. When the transistor T2 comes into the off state, the control node Na comes into a floating state, and the gate-drain voltage of the transistor T1 is held in the capacitor C1. A drive current flowing through the transistor T1 and the organic EL element L1 changes in accordance with the gate-source voltage of the transistor T1. The organic EL element L1 emits light with luminance corresponding to the magnitude of the drive current. By the organic EL element L1 in each pixel circuit 17 emitting light in this way, an image is displayed on the organic EL panel 11.

Note that the configuration of the pixel circuit 17 illustrated in FIG. 3 is an example, and various pixel circuits can be adopted.

Figure 4:
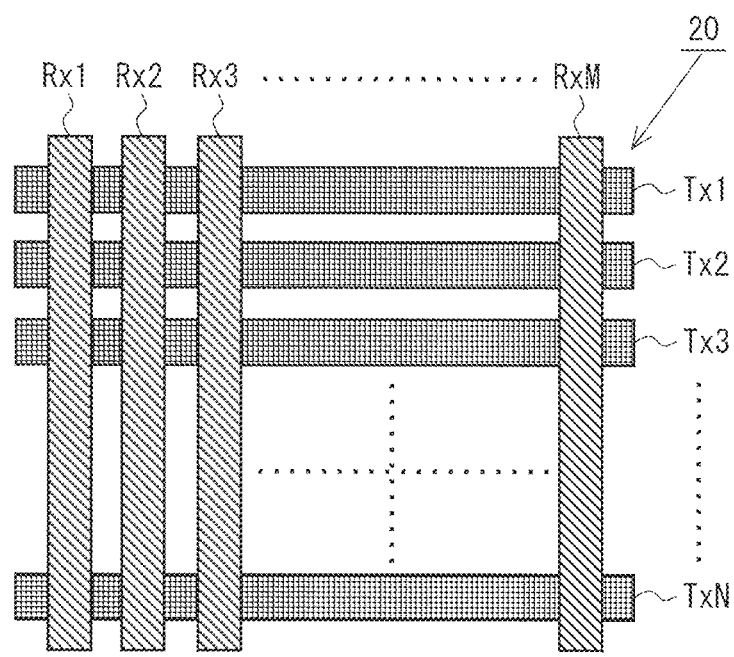
FIG. 4 is an example of a plan view of a touch panel in the embodiment.

FIG. 4 is an example of a plan view of the touch panel 20. The touch panel 20 illustrated in FIG. 4 includes N drive lines (transmission-side electrodes) Tx1 to TxN and M sense lines (reception-side electrodes) Rx1 to RxM as sensor electrodes. The drive lines Tx1 to TxN are arranged parallel to each other. The sense lines Rx1 to RxM are arranged parallel to each other. The drive lines Tx1 to TxN and the sense lines Rx1 to RxM are perpendicular to each other. At the time of performing the self-capacitance sensing, all of the drive lines Tx1 to TxN and all of the sense lines Rx1 to RxM are driven simultaneously. At the time of performing the mutual capacitance sensing, the N drive lines Tx1 to TxN are driven one by one with all sense lines Rx1 to RxM turned on.

Figure 5:
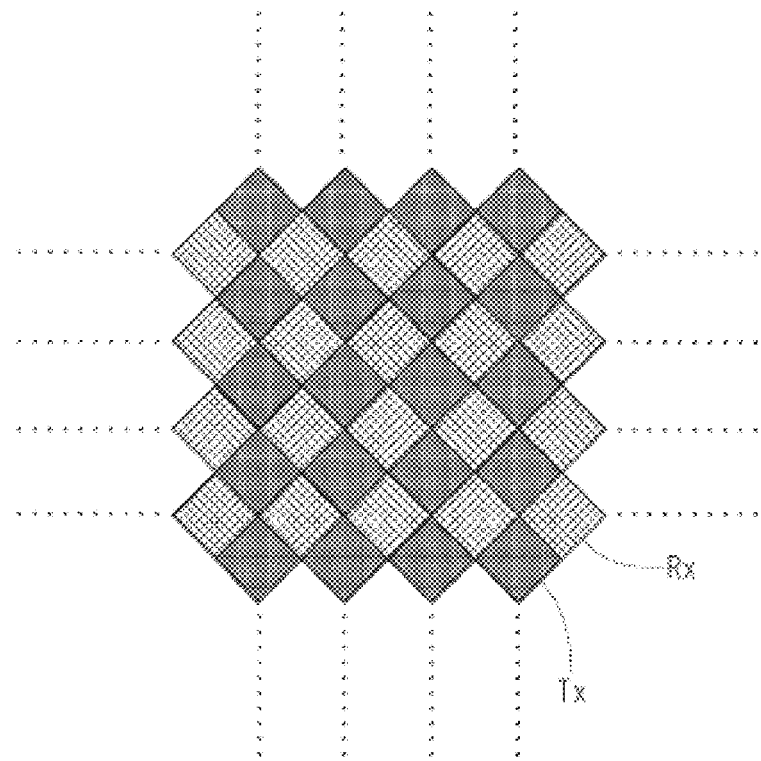
FIG. 5 is another example of a plan view of the touch panel in the embodiment.

Note that the touch panel 20 may be formed of sensor electrodes called a diamond pattern as illustrated in FIG. 5. In this case, it is possible to adopt a configuration in which the transmission-side electrode Tx and the reception-side electrode Rx are formed in different layers, a configuration in which the transmission-side electrode Tx and the reception-side electrode Rx are formed in the same layer, a configuration called a metal mesh type (a configuration in which silver or copper is used instead of using an indium-tin-oxide (ITO) film as in the known case), or the like.

2. Detection Method for Touch Position

<2.1 Overview>

In the present embodiment, a touch position can be detected by both the self-capacitance system and the mutual capacitance system. As described above, a negative signal (negative-value data) can occur during the mutual capacitance sensing. In contrast, no negative signal is generated during the self-capacitance sensing. Therefore, when a negative signal is generated by the mutual capacitance sensing, the mutual capacitance detection data is corrected using the self-capacitance detection data. Then, the center of gravity is calculated on the basis of the mutual capacitance detection data after the correction (the original mutual capacitance detection data when correction is not required) to finally specify the touch position. Note that the detection data includes noise and the like for both the mutual capacitance sensing and the self-capacitance sensing. Therefore, in general, a threshold for removing noise and the like is set in advance, and processing is performed while data less than the threshold is ignored. That is, detection data (self-capacitance detection data and mutual capacitance detection data) having a value equal to or greater than the threshold is treated as significant data (data used for specifying the touch position), and detection data having a value less than the threshold is treated as non-significant data (data not used for specifying the touch position). With respect to the detection data, a value equal to or greater than the threshold is treated as a significant value, and a value less than the threshold is treated as a non-significant value.

Figure 6:
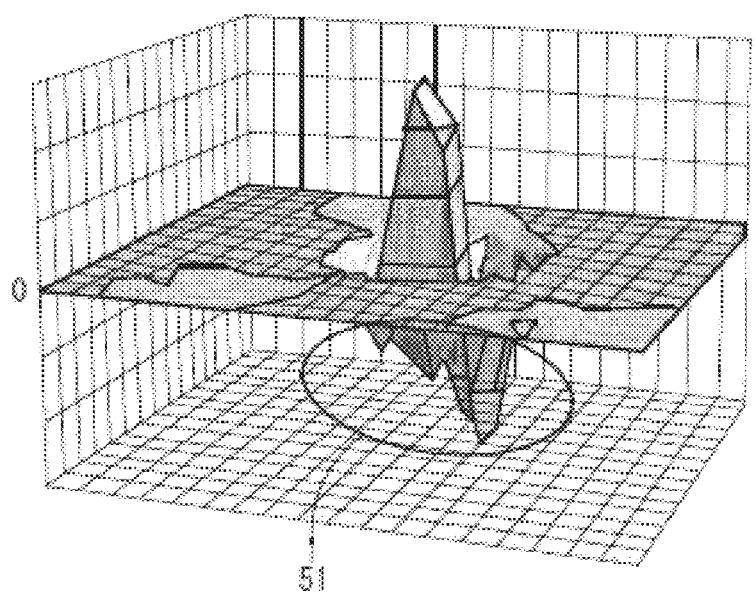
FIG. 6 is a diagram representing a detection result of mutual capacitance sensing in a three-dimensional shape.

Here, terms to be used in the following description will be described. FIG. 6 is a diagram (hereinafter, such a diagram is referred to as a "three-dimensional map") representing the detection result of the mutual capacitance sensing in a three-dimensional shape. A portion denoted by reference numeral 51 in FIG. 6 represents that a negative signal has occurred. A region in which a negative signal has occurred in this manner is referred to as a "negative-value data region". A region in which a positive value (positive-value data) is obtained as the detection result of the mutual capacitance sensing is referred to as a "positive-value data region". A region made up of the negative-value data region and the positive-value data region is referred to as a "mutual capacitance detection region".

Figures 7, 8:
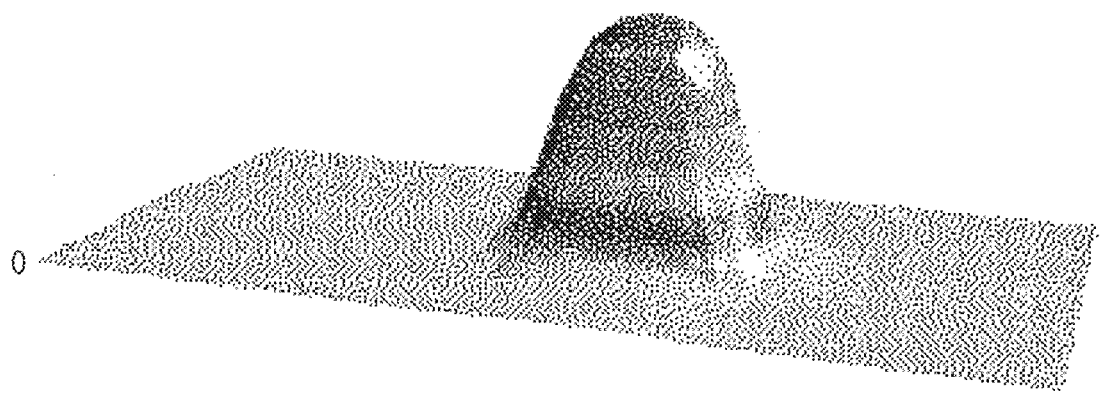
FIG. 7 is a diagram illustrating an example of a part of three-dimensional data based on self-capacitance sensing in the embodiment.
FIG. 8 is a diagram illustrating an example of a three-dimensional map based on the self-capacitance sensing in the embodiment.
Figure 9:
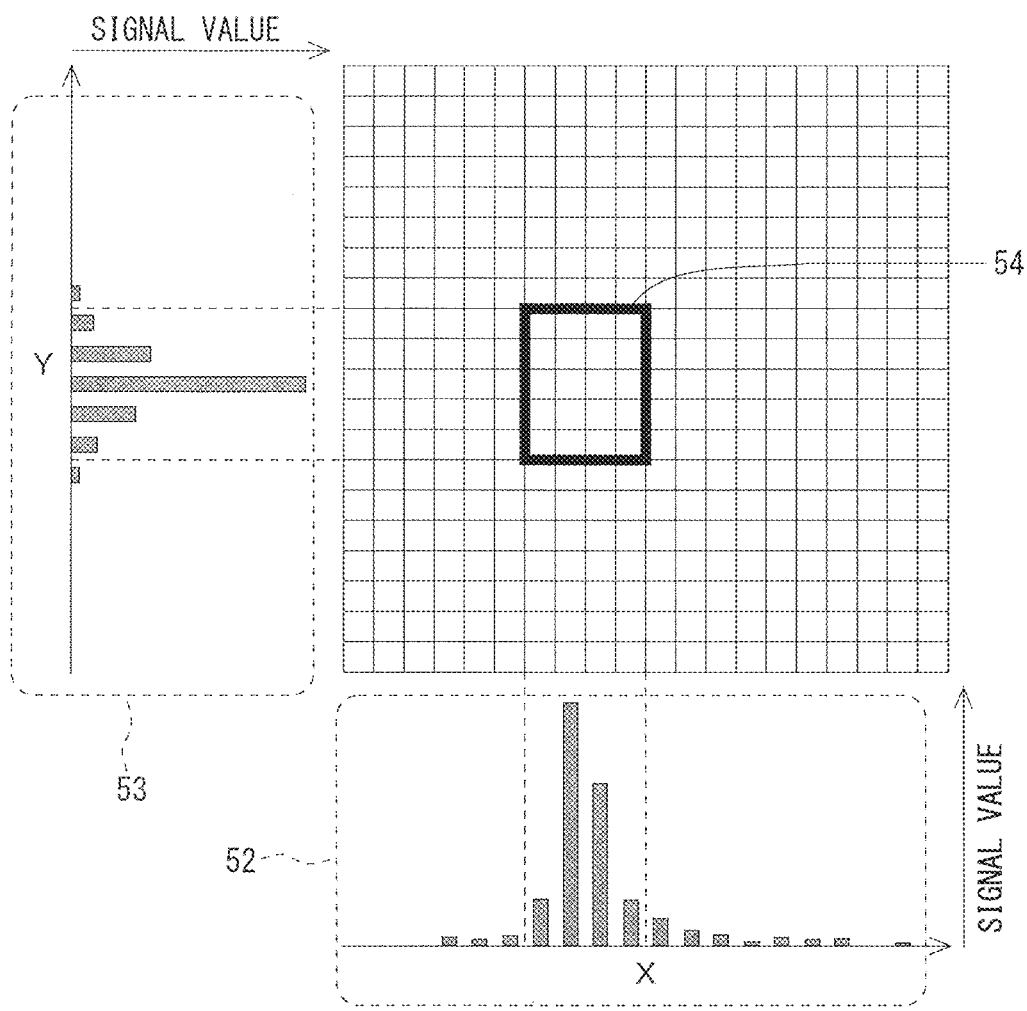
FIG. 9 is a diagram for explaining a self-capacitance detection region in the embodiment.

The detection result of the self-capacitance sensing is obtained for each drive line and each sense line. That is, the signal value as the detection result is obtained for each coordinate in the X-axis direction and for each coordinate in the Y-axis direction. Here, the signal value of each coordinate in the X-axis direction is normalized to set the sum of the signal values of all coordinates in the X-axis direction to 1, and the signal value of each coordinate in the Y-axis direction is normalized to set the sum of the signal values of all coordinates in the Y-axis direction to 1. Three-dimensional data based on the self-capacitance sensing is generated by multiplying a signal value of each coordinate in the X-axis direction after the normalization by the signal value of each coordinate in the Y-axis direction after the normalization. FIG. 7 illustrates an example of a part of the three-dimensional data. FIG. 8 illustrates an example of a three-dimensional map based on the three-dimensional data. The value of the three-dimensional data obtained as described above is compared with a threshold, and data having a value equal to or greater than the threshold is determined as significant data. A region in which such significant data is obtained by the self-capacitance sensing is referred to as a "self-capacitance detection region". As illustrated in FIG. 9, when signal values as shown in a portion denoted by reference numeral 52 have been obtained for the X-axis direction, and signal values as shown in a portion denoted by reference numeral 53 have been obtained for the Y-axis direction, for example, a region in a very thick line denoted by reference numeral 54 is a self-capacitance detection region.

Note that the self-capacitance detection region as described above is defined by the position detection circuit 32. For example, the X-axis direction corresponds to a first axis direction, and the Y-axis direction corresponds to a second axis direction. The threshold to be compared with the value of the three-dimensional data corresponds to a fourth threshold.

Figure 10:
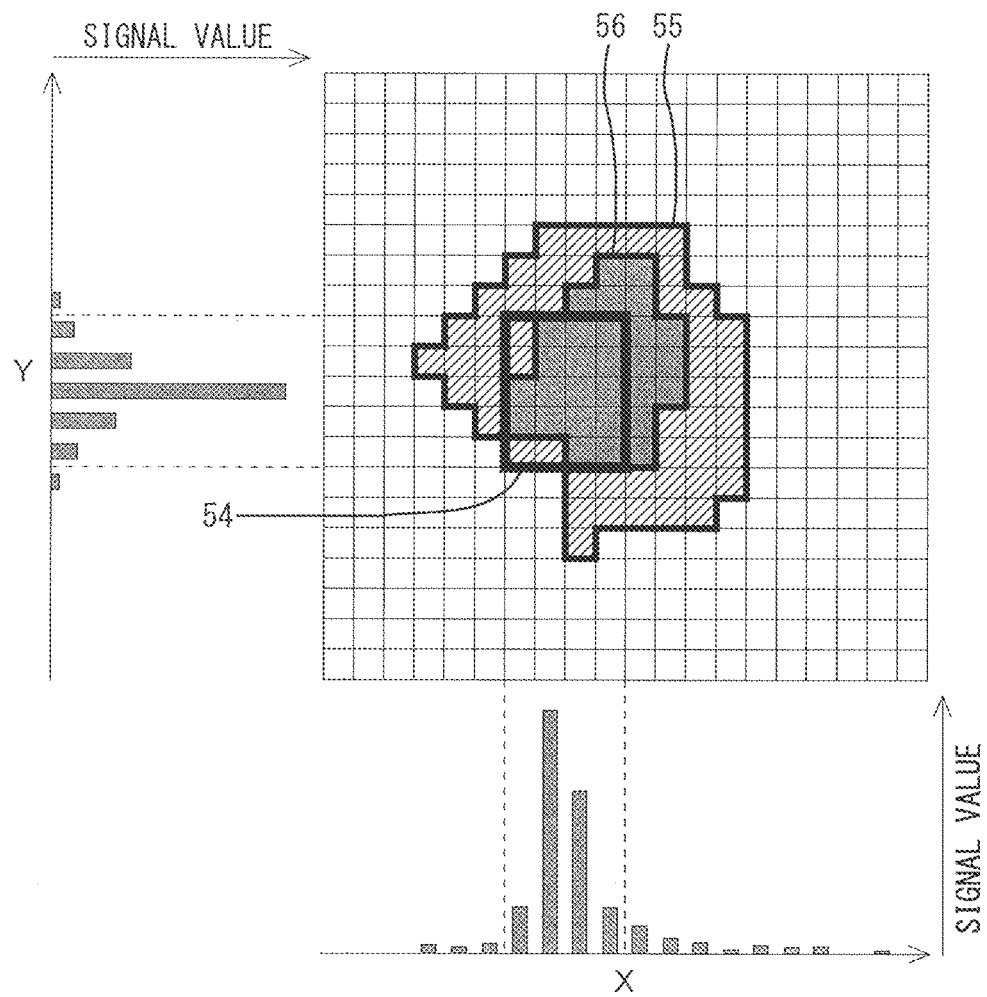
FIG. 10 is a diagram illustrating an example of how the self-capacitance detection region, a negative-value data region, and a positive-value data region overlap each other in the embodiment.

FIG. 10 is a diagram illustrating an example of how the self-capacitance detection region, the negative-value data region, and the positive-value data region overlap each other. A region in a thick line denoted by reference numeral 56 is the positive-value data region. A region excluding the positive-value data region (a region in a thick line denoted by reference numeral 56) in a region in a thick line denoted by reference numeral 55 is the negative-value data region. Since the mutual capacitance detection region is a region made up of a negative-value data region and a positive-value data region, a region in a thick line denoted by reference numeral 55 is a mutual capacitance detection region.

<2.2 Schematic Procedure of Processing for Position Detection>

Figure 11:
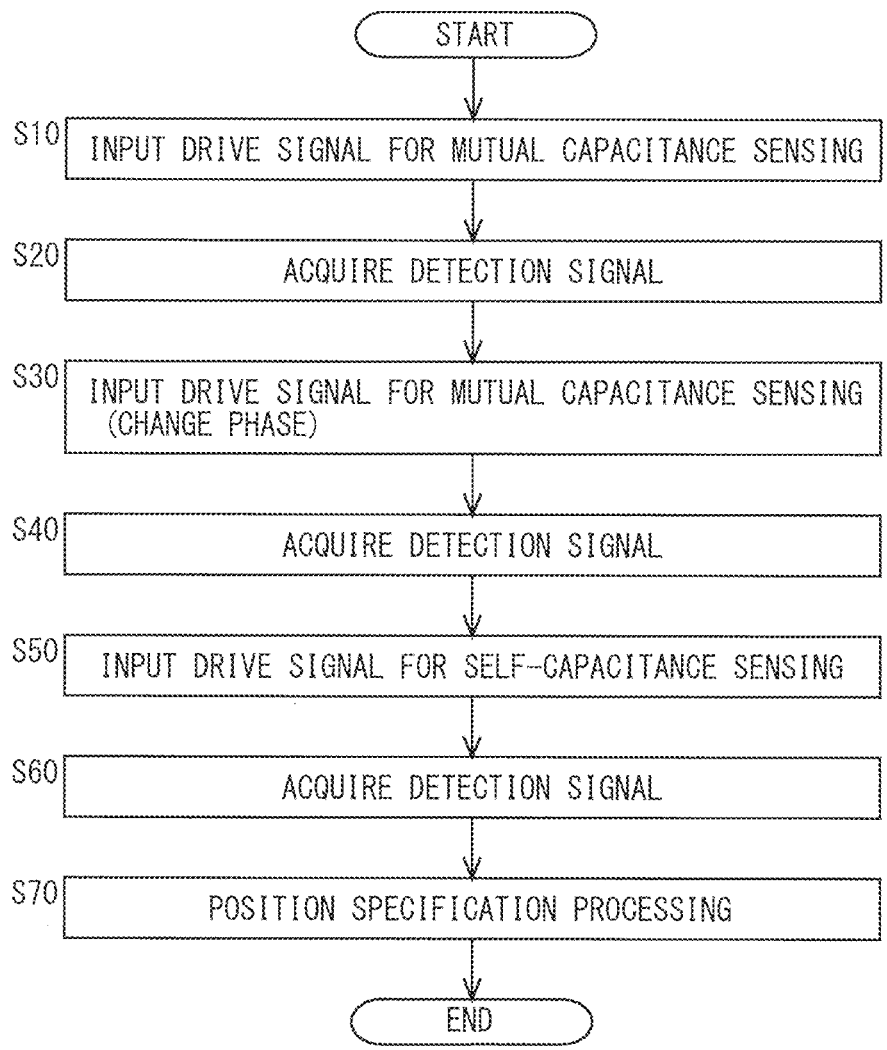
FIG. 11 is a flowchart illustrating a schematic procedure of processing for position detection in the embodiment.

With reference to a flowchart illustrated in FIG. 11, a general procedure of processing for position detection will be described. Note that, during the operation of the organic EL display device 10, the processing consisting of steps S10 to S70 illustrated in FIG. 11 is repeated.

First, the touch panel drive circuit 31 supplies the drive signal SD for mutual capacitance sensing to the touch panel 20 (step S10). Then, the position detection circuit 32 receives the detection signal SX (step S20). Next, the touch panel drive circuit 31 again supplies the drive signal SD for mutual capacitance sensing to the touch panel 20 (step S30). Then, the position detection circuit 32 receives the detection signal SX (step S40). Note that the phase of the drive signal SD is different between step S10 and step S30. Thereby, when two columns to be paired are focused, detection data for one column is obtained in step S20, and detection data for the other column is obtained in step S40. Thereafter, the touch panel drive circuit 31 supplies the drive signal SD for self-capacitance sensing to the touch panel 20 (step S50). Then, the position detection circuit 32 receives the detection signal SX (step S60). Finally, the position detection circuit 32 performs position specification processing (processing for determining whether or not a touch has been made and specifying a touch position when a touch is made) on the basis of the detection signals SX acquired in step S20, step S40, and step S60 (step S70).

<2.3 Position Specification Processing>
<2.3.1 Processing Procedure>

Figure 1:
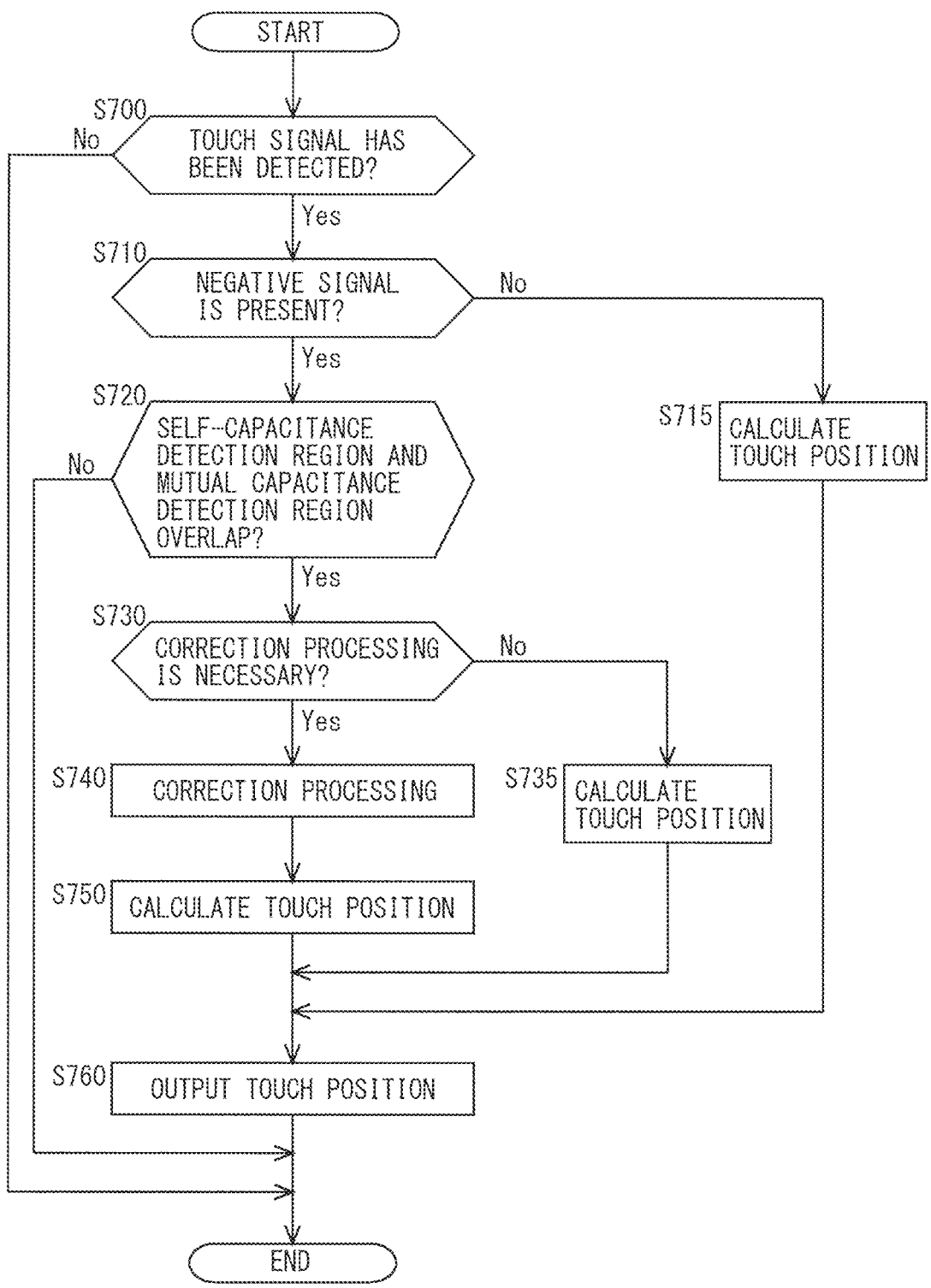
FIG. 1 is a flowchart illustrating a procedure of position specification processing in an embodiment.

Next, with reference to the flowchart illustrated in FIG. 1, the position specification processing (the processing in step S70 in FIG. 11) will be described in detail. The position specification processing is performed by the position detection circuit 32 in the touch panel controller 30.

After the start of the position specification processing, it is first determined whether or not a touch signal has been detected (step S700). Note that the touch signal here means a significant change in the detection signal SX. As a result of the determination in step S700, when the touch signal has been detected, the processing proceeds to step S710, and when no touch signal has been detected, the position specification processing ends.

In step S710, it is determined whether or not the mutual capacitance detection data includes a negative signal (negative-value data). As a result, when it is determined that the mutual capacitance detection data includes no negative signal, the processing proceeds to step S715, and when it is determined that the mutual capacitance detection data includes a negative signal, the processing proceeds to step S720.

In step S715, the touch position is calculated (specified) by calculating the center of gravity using the value of the mutual capacitance detection data as it is.

In step S720, it is determined whether or not there is a region in which the mutual capacitance detection region and the self-capacitance detection region overlap. In other words, it is determined whether or not there is a region in which significant data as self-capacitance detection data has been detected in the mutual capacitance detection region. As a result, when it is determined that there is a region in which the mutual capacitance detection region and the self-capacitance detection region overlap, the processing proceeds to step S730. On the other hand, when it is determined that there is no region in which the mutual capacitance detection region and the self-capacitance detection region overlap, it is assumed that the touch signal has been detected due to a water droplet, and the position specification processing ends without specifying the touch position.

In step S730, it is determined whether or not correction processing is necessary. Specifically, it is determined whether or not the maximum value of the absolute value of the negative signal and the size (area) of the negative-value data region are equal to or greater than respective predetermined thresholds, and when both the maximum value of the absolute value of the negative signal and the size (area) of the negative-value data region are equal to or greater than the respective predetermined thresholds, it is determined that the correction processing is necessary. As a result of the determination in step S730, when it is determined that the correction processing is necessary, the processing proceeds to step S740, and when it is determined that the correction processing is not necessary, the processing proceeds to step S735. Note that the threshold to be compared with the maximum value of the absolute value of the negative signal corresponds to a second threshold, and the threshold to be compared with the size (area) of the negative-value data region corresponds to a third threshold.

In step S735, the touch position is calculated (specified) by calculating the center of gravity using the value of the mutual capacitance detection data as it is. That is, the value of the mutual capacitance detection data for the positive-value data region and the value of the mutual capacitance detection data for the negative-value data region are used as they are to calculate the touch position. Note that the same correction processing as first correction processing to be described later may be performed on the mutual capacitance detection data to calculate the touch position by using the mutual capacitance detection data after the correction.

In step S740, correction processing for correcting the mutual capacitance detection data on the basis of the self-capacitance detection data is performed so that the influence of the negative signal is eliminated. Note that the correction processing will be described in detail later. In step S750, the touch position is calculated (specified) by calculating the center of gravity using the mutual capacitance detection data after the correction obtained in the correction processing in step S740.

In step S760, the touch position specified in any one of the step S715, the step S735, and the step S750 is outputted (a control signal PS indicating the specified touch position is outputted). Thus, the position specification processing ends.

As described above, in a case where a negative signal (negative-value data) is included in the mutual capacitance detection data, when there is a region where a mutual capacitance detection region including a negative-value data region in which the negative signal (negative-value data) has been detected by the mutual capacitance sensing and a positive-value data region that is adjacent to the negative-value data region and in which positive-value data has been detected by the mutual capacitance sensing overlaps with a self-capacitance detection region in which significant data has been detected by the self-capacitance sensing (however, in a case where the maximum value of the absolute value of the negative signal and the size of the negative-value data region are equal to or greater than the thresholds), the position detection circuit 32 executes the correction processing for correcting the mutual capacitance detection data on the basis of the self-capacitance detection data and specifies a touch position on the basis of the mutual capacitance detection data after the correction processing. When only positive-value data is included in the mutual capacitance detection data, the position detection circuit 32 specifies a touch position on the basis of only the mutual capacitance detection data without using the self-capacitance detection data.

Note that, in the present embodiment, a first determination step is achieved by the step S710, a second determination step is achieved by the step S720, a third determination step is achieved by the step S730, a correction step is achieved by the step S740, and a touch position specification step is achieved by the step S750.

<2.3.2 Correction Processing>

Next, the correction processing will be described in detail. In the present embodiment, two correction methods are prepared for the correction processing in step S740 in FIG. 1. The reason why the two correction methods are prepared is that the mutual capacitance detection data before correction are considerably different between a case where a signal breakdown described later occurs when a negative signal occurs and a case where no signal breakdown occurs when a negative signal occurs, and therefore both cases cannot be handled uniformly.

Figure 12:
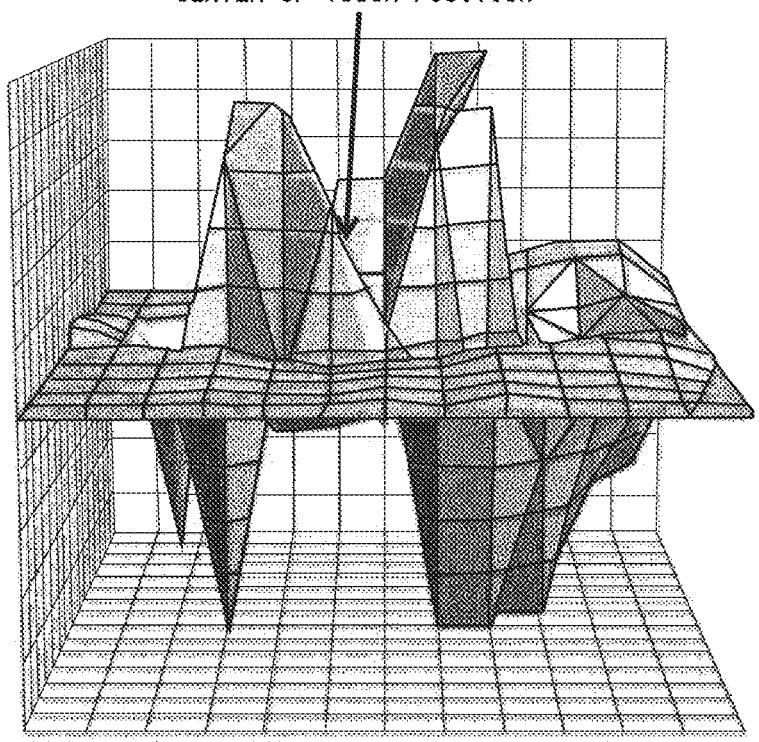
FIG. 12 is a diagram illustrating an example of a three-dimensional map based on the mutual capacitance sensing when a signal breakdown occurs in the embodiment.

The detection signal obtained by the touch panel of the electrostatic capacitance system varies depending on whether or not the ground potential when the human body is regarded as a conductor is common to the ground potential of the touch panel. The detection signal also varies in accordance with a target size (a touch area of a recognition object). In this regard, in a state in which the ground potential when the human body is regarded as a conductor and the ground potential of the touch panel are not common (floating state) (e.g., when an electronic device with a touch panel, such as a smartphone, is not connected to an AC power), static electricity hardly flows from the touch panel to the human body, and when a touch is made with a large finger in such a floating state, an electric flow different from the original one occurs. As a result, the mutual capacitance detection data with its three-dimensional map represented, for example, as illustrated in FIG. 12 is obtained by the mutual capacitance sensing. In the example illustrated in FIG. 12, the data at the center of the touch position is inappropriate data for specifying a touch position (hereinafter referred to simply as "inappropriate data"). Such a state is referred to as a "signal breakdown".

In a case where the negative signal has occurred but no signal breakdown has occurred as in the example illustrated in FIG. 6, it is considered that the influence of the negative signal can be eliminated by ignoring the negative signal, that is, by correcting the value of the mutual capacitance detection data for the negative-value data region to zero, for example, because the data at the center of the touch position is not inappropriate data. In contrast, in a case where the negative signal has occurred and the signal breakdown has also occurred as in the example illustrated in FIG. 12, because the data at the center of the touch position is inappropriate data, the touch position cannot be accurately obtained only by correcting the value of the mutual capacitance detection data for the negative-value data region to 0. Therefore, the two correction methods are provided as described above. In this regard, since the signal breakdown occurs when the target size is large, it is preferable to determine the correction method on the basis of the magnitude of the target size. The magnitude of the target size can be determined from the detection result of the self-capacitance sensing. This will be described below.

Figure 13:
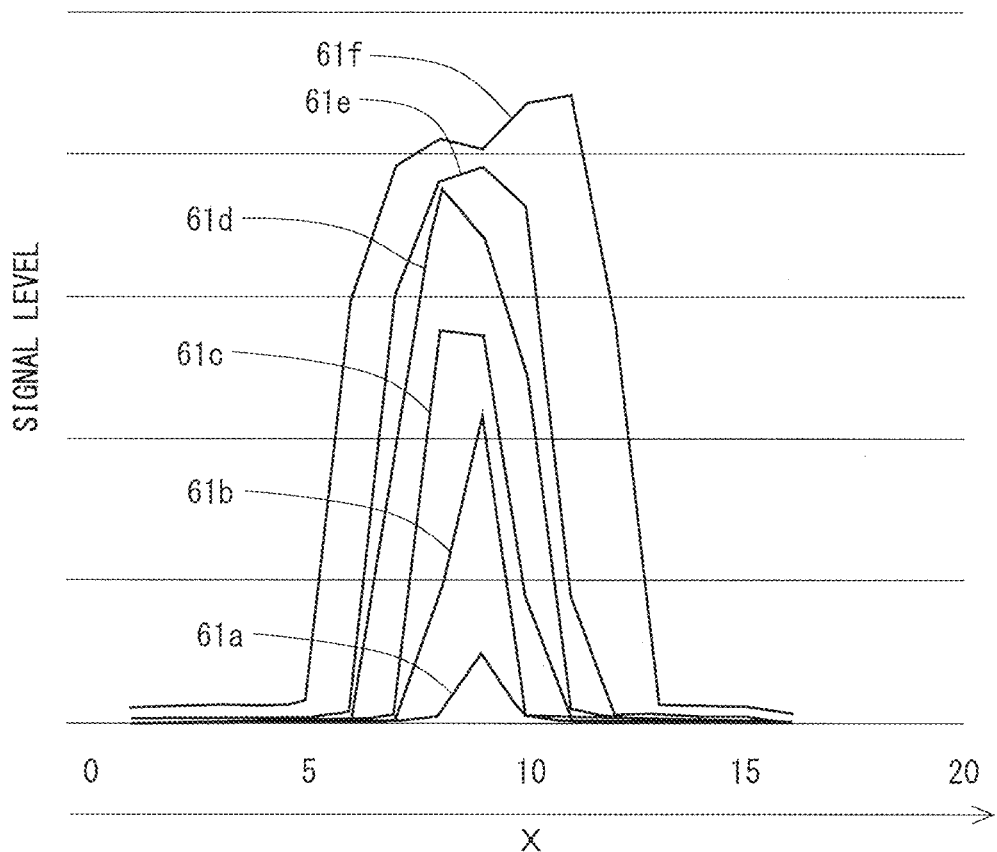
FIG. 13 is a graph illustrating a difference in a signal level (signal level in the X-axis direction) obtained by the self-capacitance sensing in accordance with a target size.
Figure 14:
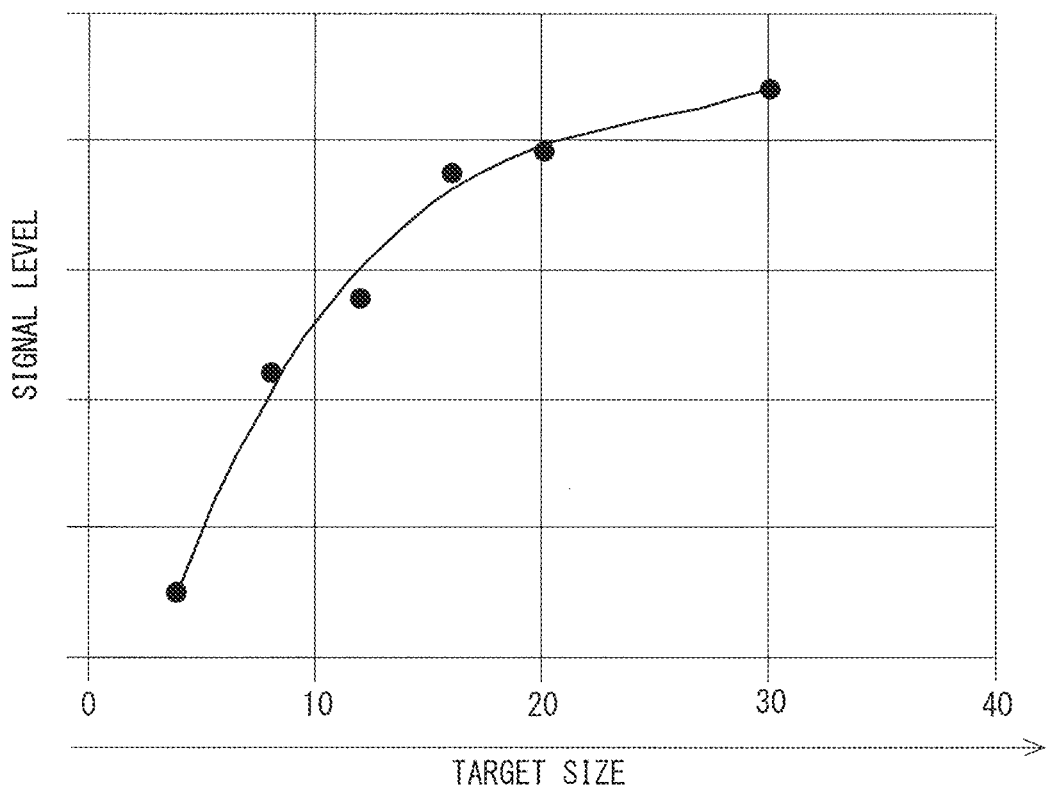
FIG. 14 is a graph representing a "relationship between target size and signal level" based on FIG. 13.
Figure 15:
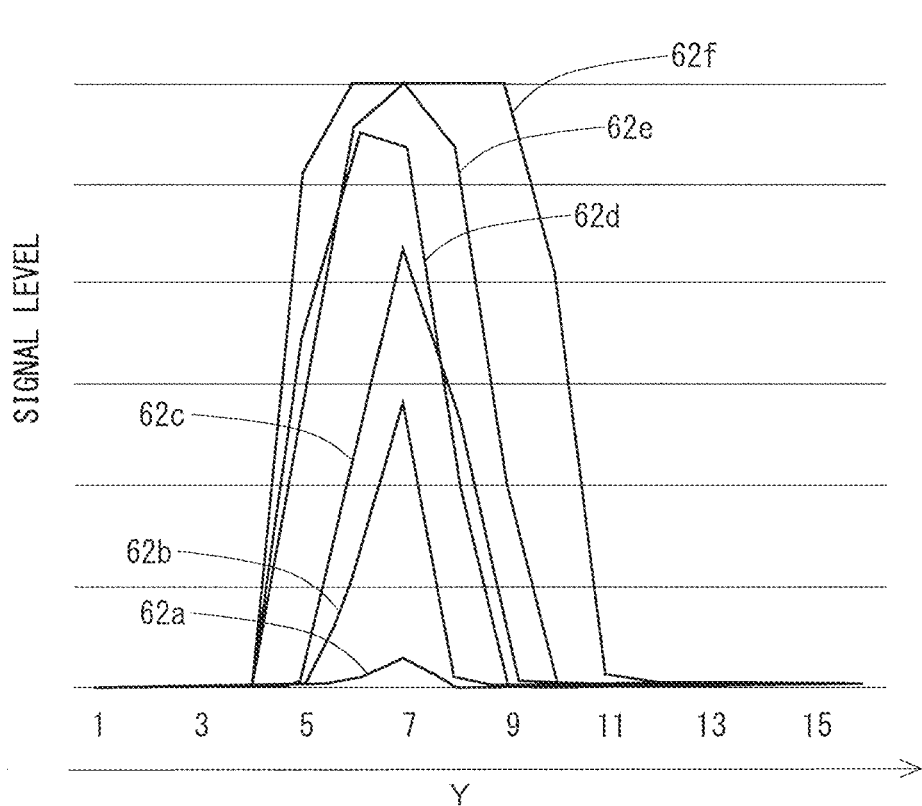
FIG. 15 is a graph illustrating a difference in a signal level (signal level in the Y-axis direction) obtained by the self-capacitance sensing in accordance with the target size.
Figure 16:
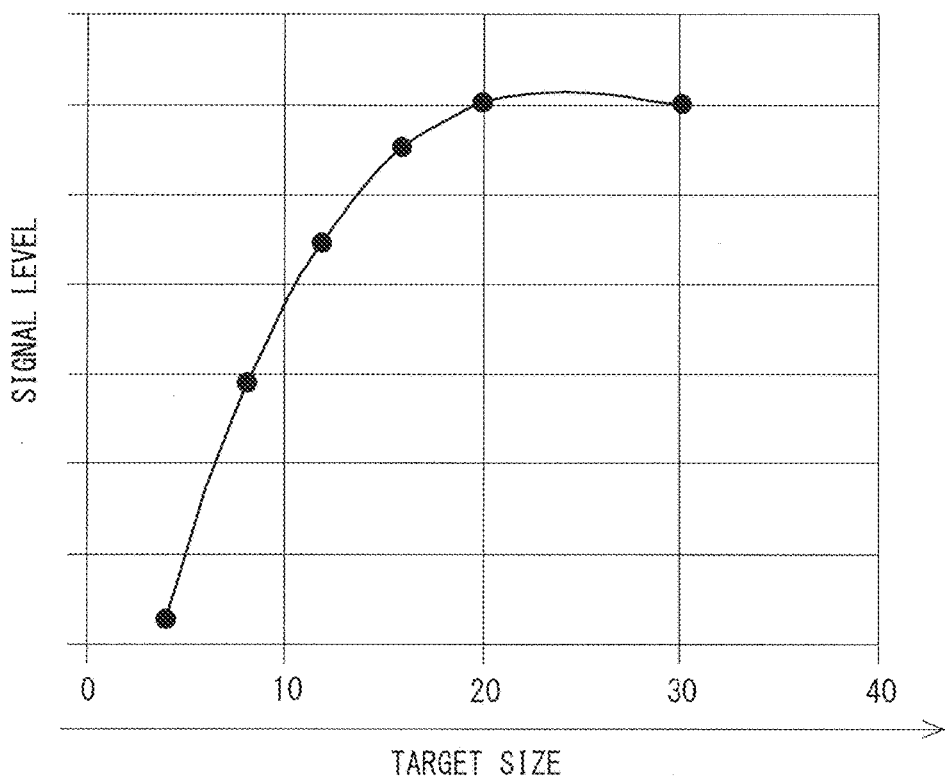
FIG. 16 is a graph representing a "relationship between target size and signal level" based on FIG. 15.

In the self-capacitance sensing, since the difference between the capacitance values of one sensor electrode is detected, the state of the adjacent sensor electrode does not affect the value (signal level) of the detection signal. Therefore, no negative signal occurs regardless of the distance between the contact surface of the finger as the recognition object and the sensor electrode. Further, being a floating state has little effect on the value of the detection signal. As thus described, a stable detection result can be obtained according to the self-capacitance sensing. FIG. 13 is a graph illustrating a difference in signal level (signal level in the X-axis direction) obtained by the self-capacitance sensing in accordance with the target size. Lines denoted by reference numerals 61a, 61b, 61c, 61d, 61e, and 61f represent data with target sizes (diameters) of 4 mm, 8 mm, 12 mm, 16 mm, 20 mm, and 30 mm, respectively. FIG. 14 is a graph representing a "relationship between target size and signal level" based on FIG. 13. FIG. 15 is a graph illustrating a difference in signal level (signal level in the Y-axis direction) obtained by the self-capacitance sensing in accordance with the target size. Lines denoted by reference numerals 62a, 62b, 62c, 62d, 62e, and 62f represent data with target sizes (diameters) of 4 mm, 8 mm, 12 mm, 16 mm, 20 mm, and 30 mm, respectively. FIG. 16 is a graph representing a "relationship between target size and signal level" based on FIG. 15. From FIGS. 13 to 16, it can be seen that the signal level increases as the target size increases. That is, the magnitude of the target size can be determined on the basis of the signal level. As described above, the magnitude of the target size can be determined from the detection result of the self-capacitance sensing.

Figure 17:
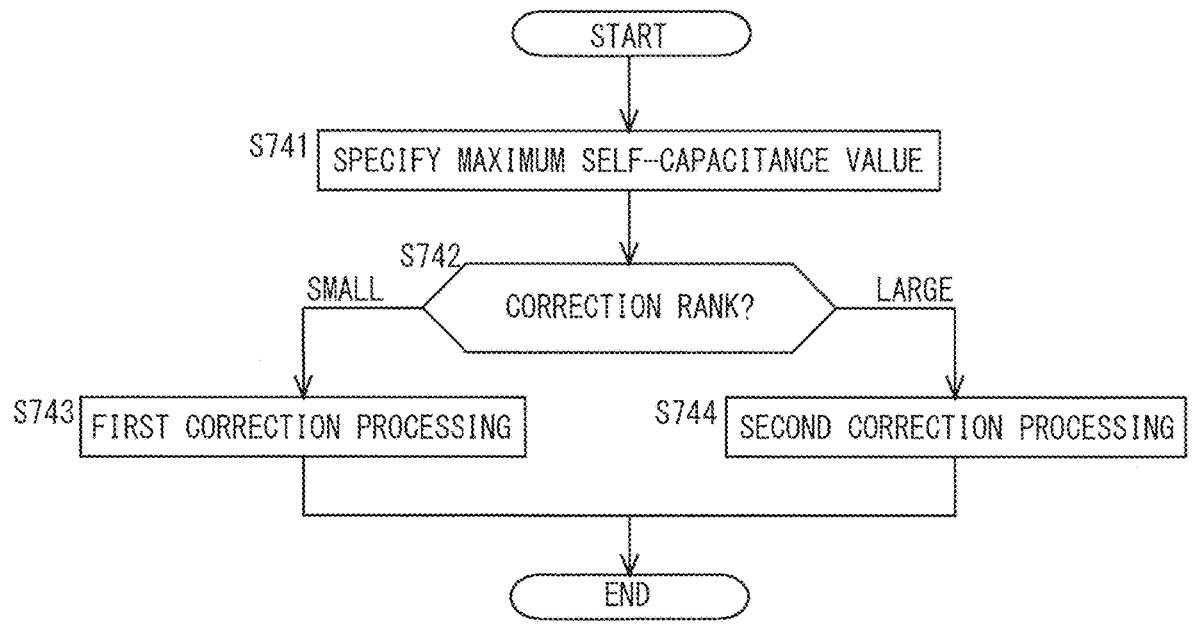
FIG. 17 is a flowchart illustrating a detailed procedure of correction processing in the embodiment.

Therefore, in the present embodiment, correction processing for correcting the value of the mutual capacitance detection data is performed while switching is made between the two correction methods in accordance with the detection result of the self-capacitance sensing. With reference to a flowchart illustrated in FIG. 17, a detailed procedure of the correction processing will be described.

After the start of the correction processing, first, the maximum value of the self-capacitance detection data (hereinafter referred to as "maximum self-capacitance value") in the mutual capacitance detection region is specified (step S741). Since the detection signal SX is obtained for each drive line and each sense line during the self-capacitance sensing, the maximum value for the drive line (hereinafter referred to as "first axis maximum value") and the maximum value for the sense line (hereinafter referred to as "second axis maximum value") are obtained as the maximum self-capacitance values at step S741.

Next, a correction rank for determining a correction method is determined on the basis of the maximum self-capacitance value (step S742). In the present embodiment, two correction ranks of "large" and "small" are prepared. The correction rank "large" is associated with a correction method in a case where the target size is large, and the correction rank "small" is associated with a correction method in a case where the target size is small. In step S742, the first axis maximum value and the second axis maximum value are compared with a threshold prepared in advance. When the first axis maximum value is equal to or less than the threshold and the second axis maximum value is equal to or less than the threshold, the correction rank is determined to be "small" since the target size is considered to be small. When the first axis maximum value is greater than the threshold or the second axis maximum value is greater than the threshold, the correction rank is determined to be "large" since the target size is considered to be large. When the correction rank is determined to be "small", the processing proceeds to step S743, and when the correction rank is determined to be "large", the processing proceeds to step S744.

Note that the correction rank may be determined by comparing the area of the self-capacitance detection region with a threshold. Further, the correction rank may be determined on the basis of the value at the position of the center of gravity determined on the basis of the self-capacitance detection data and the area of the self-capacitance detection region. Further, although the example of preparing the two correction methods is shown here, the configuration may be such that three or more correction methods are prepared to provide multi-stage thresholds and the correction is performed by an appropriate correction method in accordance with the target size.

Figure 18:
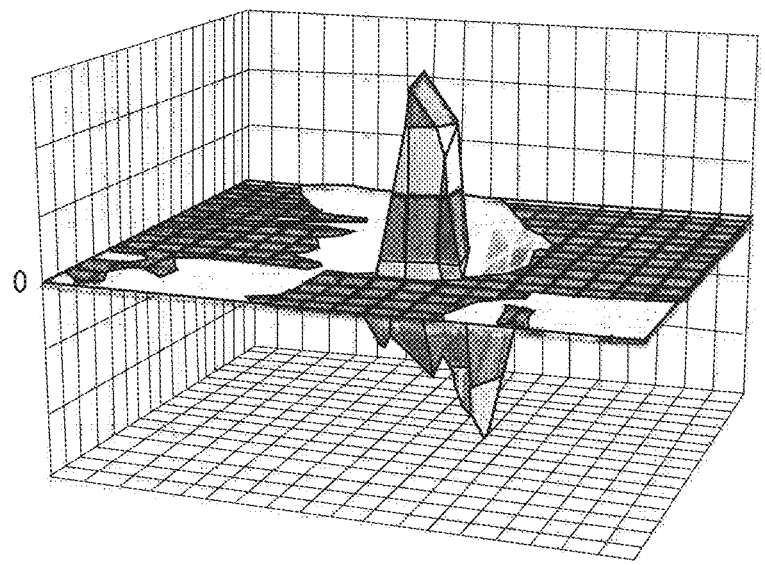
FIG. 18 is a diagram illustrating an example of a three-dimensional map based on mutual capacitance detection data before first correction processing is executed in the embodiment.
Figure 19:
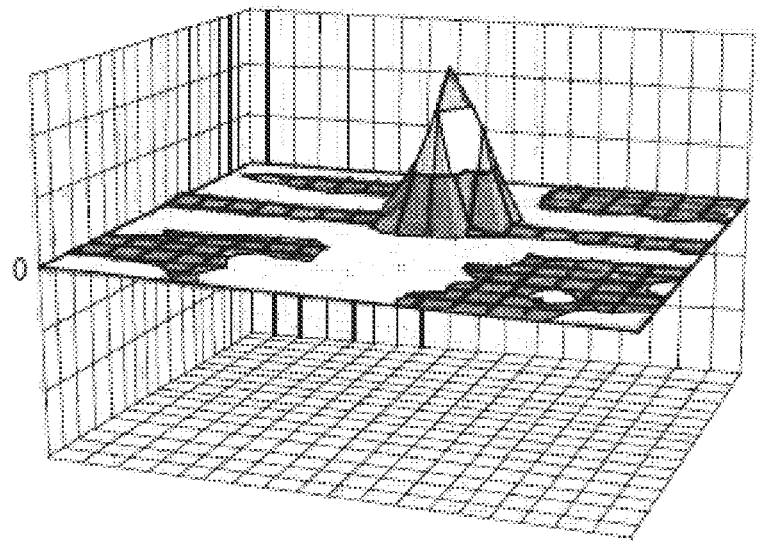
FIG. 19 is a diagram illustrating an example of a three-dimensional map based on mutual capacitance detection data after the first correction processing is executed in the embodiment.

In step S743, first correction processing which is correction processing corresponding to the correction rank "small" is performed. The first correction processing is processing associated with a case where the target size is small and is typically performed in a case where no signal breakdown has occurred or in a case where the range of the signal breakdown is extremely narrow even when the signal breakdown has occurred. In the first correction processing, the value of the mutual capacitance detection data for the negative-value data region is corrected to a predetermined value (fixed value) equal to or greater than 0. The predetermined value is preferably a value (e.g., "0") equal to or less than a predetermined threshold so as to be processed as if a significant detection signal was not obtained. That is, a non-significant value as the value of the mutual capacitance detection data is preferably set to the above predetermined value. By the first correction processing, the three-dimensional map based on the mutual capacitance detection data changes from the one illustrated in FIG. 18 to the one illustrated in FIG. 19, for example.

In step S744, second correction processing which is correction processing corresponding to the correction rank "large" is performed. The second correction processing is processing associated with a case where the target size is large and is typically performed in a case where the signal breakdown has occurred over a wide range. In the second correction processing, the self-capacitance detection data is used to correct the mutual capacitance detection data so that the three-dimensional map after the correction has a mountain shape. Specifically, all values of the mutual capacitance detection data are rewritten to "0". Then, all values of the self-capacitance detection data are normalized so that the maximum value of the self-capacitance detection data is equal to the maximum value that the mutual capacitance detection data can take (e.g., "1024" when the mutual capacitance detection data is 10-bit data). For example, the data illustrated in FIG. 7 becomes the data illustrated in FIG. 20 by normalization. Further, each value of the mutual capacitance detection data is rewritten to a value of a corresponding position in the self-capacitance detection data after the normalization. Thus, the mutual capacitance detection region and the self-capacitance detection region become equal.

Figure 21:
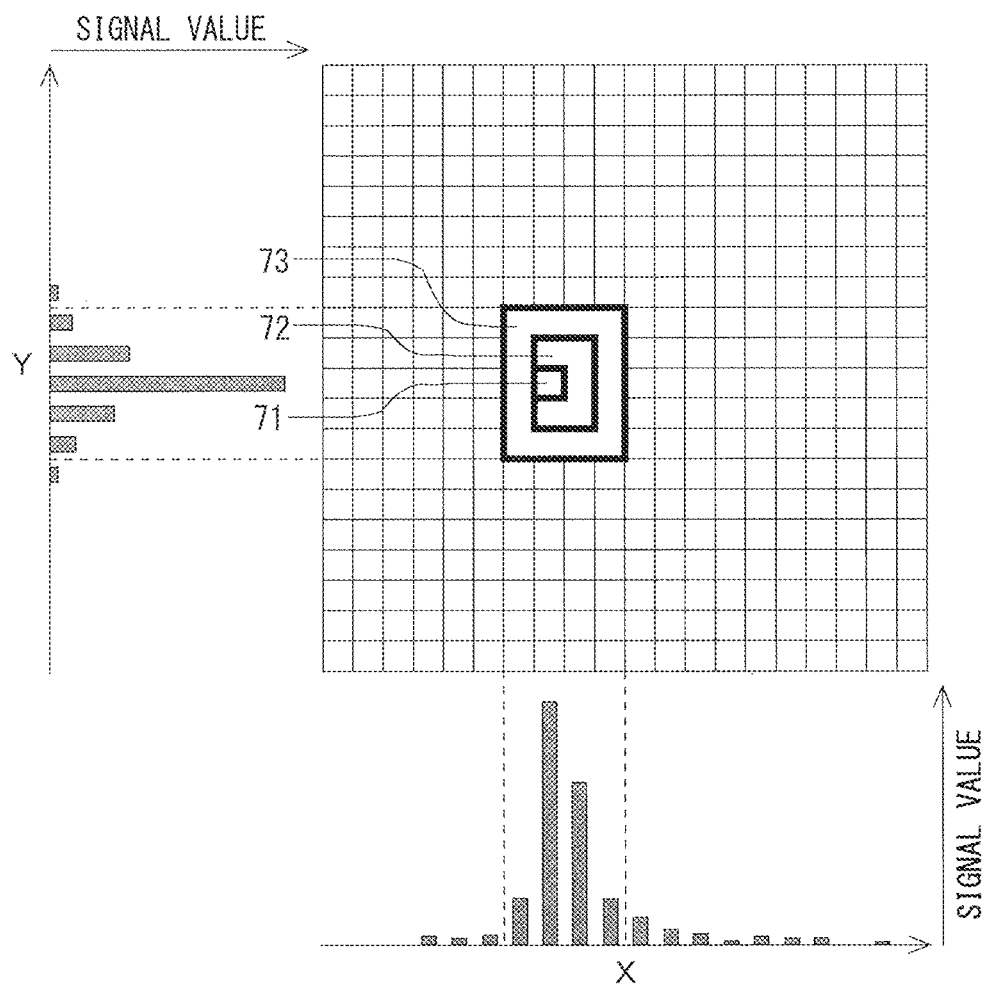
FIG. 21 is a diagram for explaining second correction processing in the embodiment.
Figure 22:
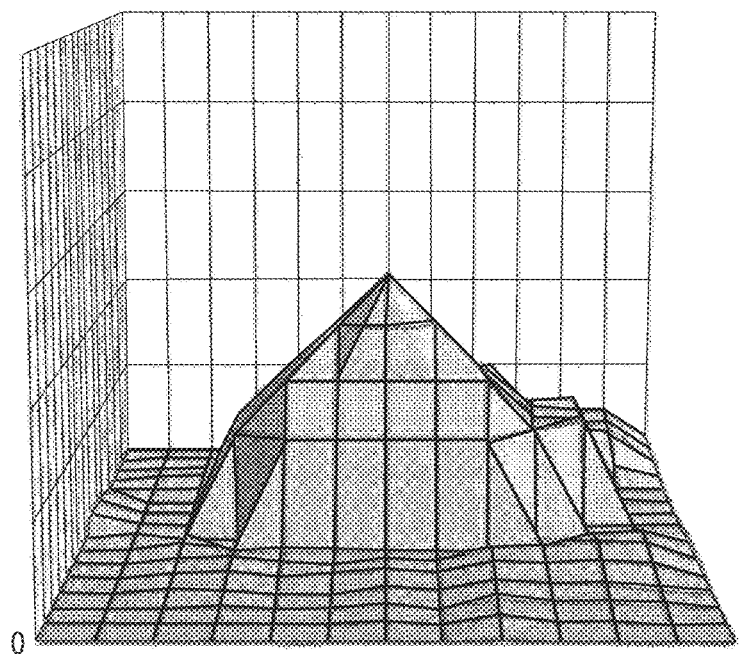
FIG. 22 is a diagram illustrating an example of a three-dimensional map based on mutual capacitance detection data after the second correction processing is executed in the embodiment.

When the overlap of the self-capacitance detection region, the negative-value data region, and the positive-value data region is as illustrated in FIG. 10 before the execution of the second correction processing, the value of the mutual capacitance detection data is corrected by the second correction processing so as to satisfy a relationship "a signal value of a region denoted by reference numeral 71>a signal value of a region denoted by reference numeral 72>a signal value of a region denoted by reference numeral 73" regarding FIG. 21. By the second correction processing, the three-dimensional map based on the mutual capacitance detection data changes from the one illustrated in FIG. 12 to the one illustrated in FIG. 22, for example.

As described above, in the present embodiment, as a combination of the two correction methods, a combination of the following methods is adopted: the method (first correction processing) of correcting the value of the mutual capacitance detection data for the negative-value data region to a predetermined value equal to or greater than 0; and the method (second correction processing) of normalizing the self-capacitance detection data so that the maximum value of the self-capacitance detection data for the mutual capacitance detection region including the negative-value data region is equal to the maximum value that the mutual capacitance detection data can take and then correcting each value of the mutual capacitance detection data to a value of a corresponding position in the self-capacitance detection data after the normalization.

<2.3.3 Modification of Second Correction Processing>

Here, a modification of the second correction processing will be described. In the present modification, the self-capacitance detection data is used to correct the mutual capacitance detection data so that the three-dimensional map after the correction has a shape close to a square frustum. Specifically, first, the value of the mutual capacitance detection data for the region except for the self-capacitance detection region is rewritten to a value equal to or less than a predetermined threshold (this threshold corresponds to the first threshold). Preferably, the value of the mutual capacitance detection data for the region except for the self-capacitance detection region is rewritten to, for example, "0" so as to be processed as if a significant detection signal was not obtained. The value of the mutual capacitance detection data for the self-capacitance detection region is corrected to a predetermined value (fixed value) equal to or greater than the above threshold. It is preferable that a value serving as a boundary between a significant value and a non-significant value regarding the value of the mutual capacitance detection data be determined as the above threshold. For example, the above predetermined value is set to a value equal to the maximum value that the mutual capacitance detection data can take (e.g., "1024" when the mutual capacitance detection data is 10-bit data). Note that the reason why the shape of the three-dimensional map after the correction is not a rectangular parallelepiped but a shape close to a square frustum is that the line connecting the coordinates (coordinates in three-dimensional space) representing the value of the region on one side of the boundary and the coordinates (coordinates in three-dimensional space) representing the value of the region on the other side of the boundary does not become perpendicular to the plane having a value of 0 in the boundary portion where the value (value of the three-dimensional data) changes.

Figure 23:
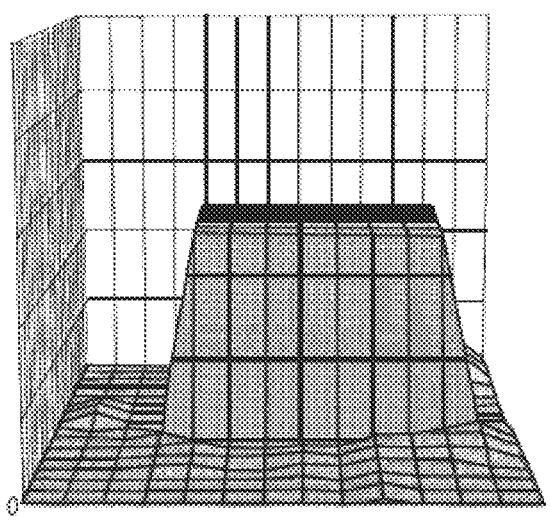
FIG. 23 is a diagram illustrating an example of a three-dimensional map based on mutual capacitance detection data after the second correction processing is executed in a modification of the embodiment.
Figure 24:
FIG. 24 is a perspective view of a bendable ultra-thin display.
Figure 25:
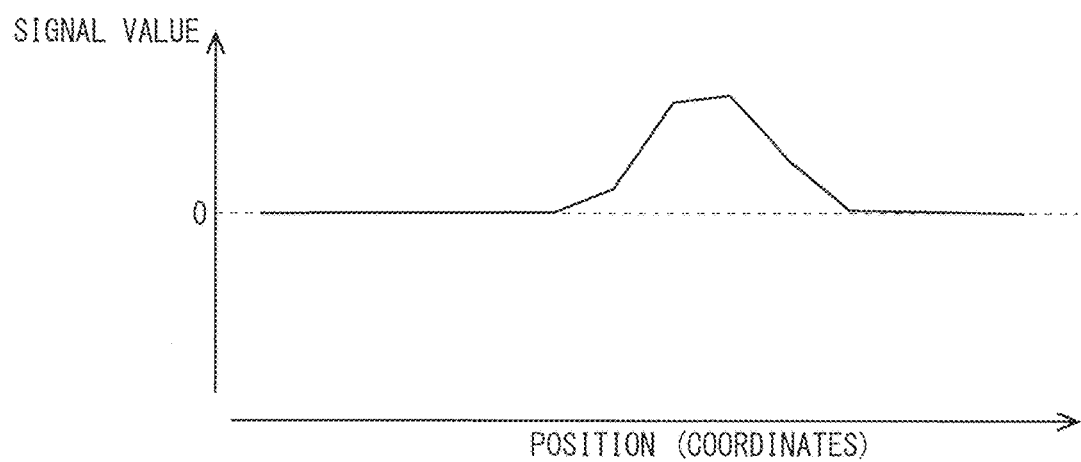
FIG. 25 is a diagram illustrating an example of a detection result when the mutual capacitance sensing is performed in a case where there is an appropriate interval between a contact surface of a finger and a sensor electrode.
Figure 26:
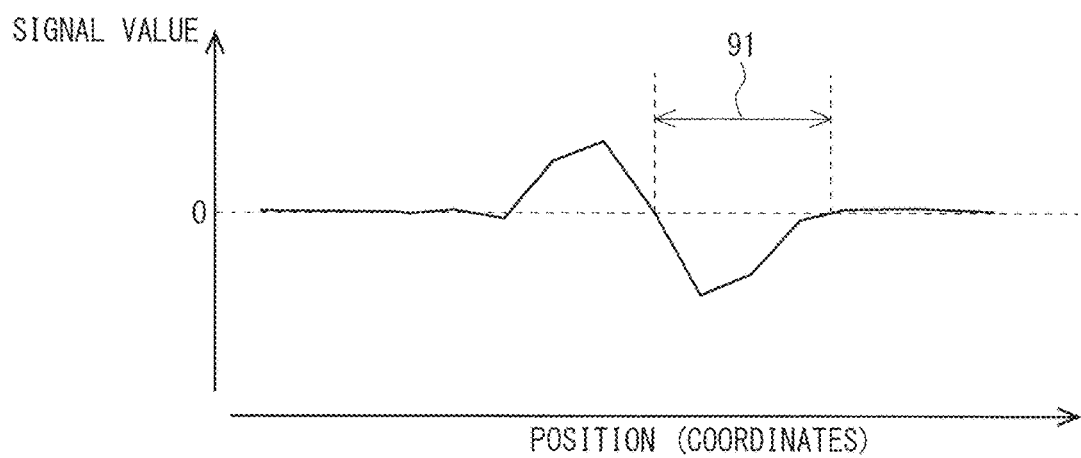
FIG. 26 is a diagram illustrating an example of a detection result when the mutual capacitance sensing is performed in a case where the contact surface of the finger and the sensor electrode are located at an extremely close distance.
Figure 27:
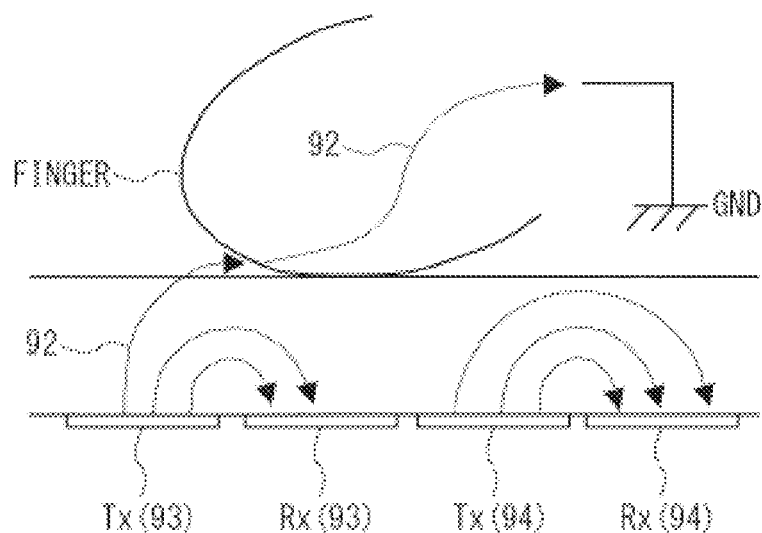
FIG. 27 is a diagram for explaining the flow of electricity in a case where there is a sufficient interval between the finger and the sensor electrode.
Figure 28:
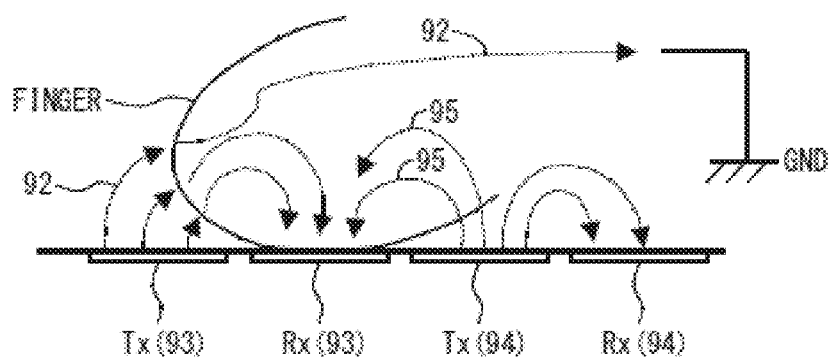
FIG. 28 is a diagram for explaining the flow of electricity in a case where a distance between the finger and the sensor electrode is extremely short.

According to the present modification, when the overlap of the self-capacitance detection region, the negative-value data region, and the positive-value data region is as illustrated in FIG. 10 before the execution of the second correction processing, the value of the mutual capacitance detection data is corrected by the second correction processing so that the value becomes a predetermined value (fixed value) equal to or greater than the threshold for the region in the very thick line denoted by reference numeral 54 in FIG. 9 and the value becomes, for example, "0" for the other region. Therefore, in the present modification, the three-dimensional map based on the mutual capacitance detection data changes from the one illustrated in FIG. 12 to the one illustrated in FIG. 23, for example.

In the present modification, as a combination of the two correction methods, a combination of the following methods is adopted: the method (first correction processing) of correcting the value of the mutual capacitance detection data for the negative-value data region to a predetermined value equal to or greater than 0; and the method (second correction processing) of rewriting the value of the mutual capacitance detection data for the region not overlapping with the self-capacitance detection region in the mutual capacitance detection region including the negative-value data region to a value equal to or less than a predetermined threshold (first threshold) and then correcting the value of the mutual capacitance detection data for the region overlapping with the self-capacitance detection region in the mutual capacitance detection region including the negative-value data region to a predetermined value equal to or greater than the above threshold (first threshold).

3. Effects

According to the present embodiment, in a case where a negative signal occurs by the mutual capacitance sensing, when a predetermined condition is satisfied, the mutual capacitance detection data is corrected on the basis of the self-capacitance detection data, and the touch position is specified on the basis of the mutual capacitance detection data after the correction. Since a stable detection result can be obtained by the self-capacitance sensing regardless of the distance between the recognition object such as the finger and the sensor electrode, by correcting the mutual capacitance detection data on the basis of the self-capacitance detection data, the value of the mutual capacitance detection data after the correction can be set to a suitable value from which the influence of the negative signal has been removed. Thus, even when a negative signal occurs, a touch position can be specified with high accuracy. From the above, according to the present embodiment, there is achieved the organic EL display device 10 provided with the position detector that can detect a touch position with high accuracy even when thickness reduction proceeds.

4. Others

Although the organic EL display device has been described as an example of the electronic device provided with the position detector in the above embodiment, it is not limited to this. The present disclosure can also be applied to a liquid crystal display device, an inorganic EL display device, a quantum dot light-emitting diode (QLED) display device, a flexible display device, and the like so long as being provided with a position detector including a touch panel.

DESCRIPTION OF REFERENCE CHARACTERS

10: ORGANIC EL DISPLAY DEVICE
17: PIXEL CIRCUIT
20: TOUCH PANEL
30: TOUCH PANEL CONTROLLER
31: TOUCH PANEL DRIVE CIRCUIT

32: POSITION DETECTION CIRCUIT
L1: ORGANIC EL ELEMENT

The invention claimed is:

1. An electronic device comprising:
a display panel configured to display an image; and
a position detector configured to detect a touch position,
wherein
the position detector includes
 a touch panel provided on a surface of the display panel,
 a touch panel drive circuit configured to drive the touch panel so that a touch position is detected by both a self-capacitance system and a mutual capacitance system, and
 a position detection circuit configured to specify a touch position on a basis of self-capacitance detection data being data detected by the self-capacitance system and mutual capacitance detection data being data detected by the mutual capacitance system, and
in a case where negative-value data is included in the mutual capacitance detection data, when there is a region where a mutual capacitance detection region including a negative-value data region in which negative-value data is detected by the mutual capacitance system and a positive-value data region that is adjacent to the negative-value data region and in which positive-value data is detected by the mutual capacitance system overlaps with a self-capacitance detection region in which significant data is detected by the self-capacitance system, the position detection circuit executes correction processing for correcting the mutual capacitance detection data on a basis of the self-capacitance detection data and specifies a touch position on a basis of the mutual capacitance detection data after the correction processing.

2. The electronic device according to claim 1, wherein as a method for the correction processing, the position detection circuit normalizes the self-capacitance detection data so that a maximum value of the self-capacitance detection data for the mutual capacitance detection region including the negative-value data region is equal to a maximum value that the mutual capacitance detection data is able to take, and corrects each value of the mutual capacitance detection data to a value of a corresponding position in the self-capacitance detection data after the normalization.

3. The electronic device according to claim 1, wherein as a method for the correction processing, the position detection circuit corrects a value of the mutual capacitance detection data for a region not overlapping with the self-capacitance detection region in the mutual capacitance detection region including the negative-value data region to a value equal to or less than a predetermined first threshold and corrects a value of the mutual capacitance detection data for a region overlapping with the self-capacitance detection region in the mutual capacitance detection region including the negative-value data region to a predetermined value equal to or greater than the first threshold.

4. The electronic device according to claim 3, wherein the first threshold is a value serving as a boundary between a significant value and a non-significant value regarding values of the mutual capacitance detection data.

5. The electronic device according to claim 3, wherein the predetermined value is equal to a maximum value that the mutual capacitance detection data is able to take.

6. The electronic device according to claim 1, wherein as a method for the correction processing, the position detection circuit corrects the value of the mutual capacitance detection data for the negative-value data region to a predetermined value equal to or greater than 0.

7. The electronic device according to claim 6, wherein the predetermined value is a non-significant value as the value of the mutual capacitance detection data.

8. The electronic device according to claim 1, wherein the position detection circuit executes the correction processing when a maximum value of an absolute value of the negative-value data included in the mutual capacitance detection data is equal to or greater than a predetermined second threshold, and an area of the negative-value data region is equal to or greater than a predetermined third threshold.

9. The electronic device according to claim 1, wherein
two or more methods are prepared in advance as methods for the correction processing, and
the position detection circuit determines a method for the correction processing to be executed on a basis of a maximum value of the self-capacitance detection data for the region where the mutual capacitance detection region and the self-capacitance detection region overlap.

10. The electronic device according to claim 1, wherein
two or more methods are prepared in advance as methods for the correction processing, and
the position detection circuit determines a method for the correction processing to be executed on a basis of an area of the self-capacitance detection region.

11. The electronic device according to claim 1, wherein
two or more methods are prepared in advance as methods for the correction processing, and
the position detection circuit determines a method for the correction processing to be executed on a basis of a value at a position of a center of gravity obtained on a basis of the self-capacitance detection data and an area of the self-capacitance detection region.

12. The electronic device according to claim 1, wherein when negative-value data is included in the mutual capacitance detection data and there is no region where the mutual capacitance detection region and the self-capacitance detection region overlap, the position detection circuit determines that no touch is made and does not specify a touch position.

13. The electronic device according to claim 1, wherein the position detection circuit defines, as the self-capacitance detection region, a region in which a value obtained by multiplying a value, obtained by the self-capacitance system for each coordinate in a first axis direction and obtained by normalization based on a sum of values for all coordinates in the first axis direction, by a value obtained by the self-capacitance system for each coordinate in a second axis direction and obtained by normalization based on a sum of values for all coordinates in the second axis direction, is equal to or greater than a predetermined fourth threshold.

14. The electronic device according to claim 1, wherein a surface of the touch panel is formed of a film-shaped cover material.

15. The electronic device according to claim 1, wherein the display panel and the touch panel have flexibility.

16. A touch position detection method performed by a position detector capable of detecting a touch position by both a self-capacitance system and a mutual capacitance system, the method comprising:
a first determination step of determining whether mutual capacitance detection data, that is data detected by the mutual capacitance system, includes negative-value data
a second determination step of determining, when it is determined in the first determination step that the mutual capacitance detection data includes the negative-value data, whether there is a region where a mutual capacitance detection region including a negative-value data region in which negative-value data is detected by the mutual capacitance system and a positive-value data region that is adjacent to the negative-value data region and in which positive-value data is detected by the mutual capacitance system overlaps with a self-capacitance detection region in which significant data is detected by the self-capacitance system;

a third determination step of determining, when it is determined in the second determination step that there is a region in which the mutual capacitance detection region overlap with the self-capacitance detection region, whether a maximum value of an absolute value of the negative-value data and an area of the negative-value data region are equal to or greater than respective predetermined thresholds;

a correction step of correcting the mutual capacitance detection data on a basis of significant data detected by a self-capacitance system when it is determined in the third determination step that both the maximum value of the absolute value of the negative-value data and the area of the negative-value data region are equal to or greater than the respective predetermined thresholds; and a touch position specification step of specifying a touch position on a basis of the mutual capacitance detection data after the correction by the correction step.

* * * * *